United States Patent
Chou et al.

(10) Patent No.: US 8,199,247 B2
(45) Date of Patent: Jun. 12, 2012

(54) METHOD FOR USING FLASH TO ASSIST IN FOCAL LENGTH DETECTION

(75) Inventors: Chan-Min Chou, Taipei County (TW); Tsung-Pin Lu, Taipei County (TW)

(73) Assignee: Altek Corporation, Hsinchu (TW)

( * ) Notice: Subject to any disclaimer, the term of this patent is extended or adjusted under 35 U.S.C. 154(b) by 415 days.

(21) Appl. No.: 12/652,290

(22) Filed: Jan. 5, 2010

(65) Prior Publication Data
US 2011/0043682 A1 Feb. 24, 2011

(30) Foreign Application Priority Data
Aug. 21, 2009 (TW) .............................. 98128307 A

(51) Int. Cl.
*H04N 5/232* (2006.01)
*G03B 13/00* (2006.01)
*H04N 5/235* (2006.01)
*G03B 7/00* (2006.01)

(52) U.S. Cl. ....................................... 348/349; 348/362

(58) Field of Classification Search .......... 348/345–349, 348/362, 364–366, 370–371
See application file for complete search history.

(56) References Cited

U.S. PATENT DOCUMENTS

| | | | |
|---|---|---|---|
| 7,298,412 B2* | 11/2007 | Sannoh et al. | 348/348 |
| 8,106,966 B2* | 1/2012 | Chou et al. | 348/234 |
| 2007/0052821 A1* | 3/2007 | Fukui | 348/234 |
| 2007/0263909 A1* | 11/2007 | Ojima et al. | 382/118 |
| 2007/0263933 A1* | 11/2007 | Ojima et al. | 382/190 |
| 2007/0263934 A1* | 11/2007 | Ojima et al. | 382/190 |
| 2007/0263935 A1* | 11/2007 | Sanno et al. | 382/190 |
| 2007/0263997 A1* | 11/2007 | Hirai et al. | 396/123 |
| 2008/0024616 A1* | 1/2008 | Takahashi | 348/221.1 |
| 2008/0193119 A1* | 8/2008 | Miyazaki | 396/157 |
| 2008/0252773 A1* | 10/2008 | Oishi | 348/347 |

* cited by examiner

Primary Examiner — Kelly L Jerabek
(74) Attorney, Agent, or Firm — Morris Manning & Martin LLP; Tim Tingkang Xia, Esq.

(57) ABSTRACT

A method for assist in focal length detection is adapted to a digital camera having a flash. The method includes the following steps. First, the flash of the digital camera is actuated and an image having a face portion is captured. Afterwards, an exposure feature value of the face portion in the image is calculated. A focus range comparison table is looked up according to the exposure feature value to obtain an initial focus position. Then, a focus procedure is performed according to the initial focus position to obtain a target focal length. After the target focal length is obtained, a flash feature value of the image is further calculated, and a guide number (GN) and a diaphragm value are set according to the flash feature value.

8 Claims, 10 Drawing Sheets

US 8,199,247 B2

METHOD FOR USING FLASH TO ASSIST IN FOCAL LENGTH DETECTION

CROSS-REFERENCE TO RELATED APPLICATIONS

This non-provisional application claims priority under 35 U.S.C. §119(a) on Patent Application No(s). 098128307 filed in Taiwan, R.O.C. on Aug. 21, 2009, the entire contents of which are hereby incorporated by reference.

BACKGROUND OF THE INVENTION

1. Field of Invention

The present invention relates to a method for using a flash to assist in focal length detection, and more particularly to a method for looking up an exposure feature value table to assist in detecting a focal length of an image having a face.

2. Related Art

When a camera is used to take an image, the camera needs to correctly focus on an object to be photographed so as to obtain a clear picture. Nowadays, common digital cameras have an auto focus function. The auto focus may substantially be divided into two types: one is active auto focus, and the other is passive auto focus.

The technique of the active auto focus is to use a set of infrared transmitter or laser transmitter and corresponding receiver to project a pattern of light on an object to be photographed, and then calculate a distance between the camera and the object to be photographed through a method such as triangulation. This distance is a focal length. Since the optical transmitter and receiver need to be additionally set in the camera when the active auto focus is used, the problem of high cost occurs.

In the passive auto focus, before the actual photographing, a camera lens of the digital camera is moved to a plurality of focus positions corresponding to the range from a minimum focus distance closest to the digital camera to infinity. The digital camera captures an image at the focus position and analyzes a definition of the acquired image to determine a focal length. The passive auto focus only needs to use an image sensor and an operation unit of the camera, and thus the manufacturing cost can be reduced.

However, since the passive auto focus has to rely on the definition calculated from the pre-captured image, when the object to be photographed is in an environment with insufficient brightness, the estimated focal length may have an error easily. In the photographing, sufficient light enables the object to be photographed to have an obvious in-focus position, such that the camera easily finds the correct focus position. On the contrary, if the environment has insufficient brightness, the camera cannot find the correct focal length easily because the definitions of the images are generally low when the definitions are estimated. Thus, the passive auto focus has the problem of less accurate focusing when the environment is not bright enough.

Besides, when a picture is taken, a human image is a relatively important part in the picture, so operations such as focusing or light metering should be performed based on a human face before image photographing. However, the conventional auto focus methods may take the background or things other than the human as the object to be focused, such that the human which should be the key for photographing is out of focus.

SUMMARY OF THE INVENTION

In view of the above problems, the present invention is a method for using a flash to assist in focal length detection, thereby solving the problems. The method for using a flash to assist in focal length detection disclosed in the present invention is adapted to a digital camera having a flash for providing a target focal length of the digital camera based on a target to be photographed containing at least one human face. The method comprises: firing the flash, and capturing a first image of the target to be photographed; calculating an exposure feature value according to at least one face block corresponding to the human face in the first image; looking up a focus range comparison table according to the exposure feature value to acquire an initial focus position; and performing a focus procedure according to the initial focus position to obtain the target focal length.

According to a first embodiment of the present invention, the step of calculating an exposure feature value according to at least one face block in the first image comprises: searching for the face block in the first image; calculating a pixel exposure value of each pixel of a face block image; and taking an average of the pixel exposure values as the exposure feature value.

According to a second embodiment of the present invention, the step of calculating an exposure feature value based on at least one face block in the first image comprises: searching for the face block in the first image; calculating a pixel exposure value of each pixel of a face block image from a center of the face block image to edges of the face block image through gradient weighting; and taking an average of the pixel exposure values as the exposure feature value.

According to a third embodiment of the present invention, the step of calculating an exposure feature value based on at least one face block in the first image comprises: searching for the face blocks in the first image; calculating a pixel exposure value of each pixel of face block images; averaging the pixel exposure values of the pixels in each of the face block images respectively to obtain a plurality of average face exposure values; assigning a weight to each of the face blocks according to the face blocks; and calculating the exposure feature value according to the weights and the average face exposure values.

According to a fourth embodiment of the present invention, the step of calculating an exposure feature value based on at least one face block in the first image comprises: searching for the face blocks in the first image; calculating a pixel exposure value of each pixel of face block images from centers of the face block images to edges of the face block images through gradient weighting; averaging the pixel exposure values of the pixels in each of the face block images respectively to obtain a plurality of average face exposure values; assigning a weight to each of the face blocks according to the face blocks; and calculating the exposure feature value according to the weights and the average face exposure values.

According to the present invention, the focus range comparison table comprises a plurality of exposure tabulated values and a plurality of focal length values corresponding to the exposure tabulated values. The step of looking up the focus range comparison table according to the exposure feature value to acquire an initial focus position comprises: looking up the focus range comparison table for the exposure tabulated value according to the exposure feature value, and using the focal length value corresponding to the exposure feature value as the initial focus position.

According to an embodiment of the present invention, the step of performing a focus procedure according to the initial focus position to obtain the target focal length comprises: designating a focus range according to the initial focus position; capturing a focus detecting image at each of at least three focal lengths in the focus range; calculating a definition value of each of the focus detecting images; performing curve fitting on the definition values and the focal lengths corresponding to the definition values to obtain a second-order polynomial; and using the focal length corresponding to a zero slope of the second-order polynomial as the target focal length.

According to another embodiment of the present invention, after the step of performing a focus procedure according to the initial focus position to obtain the target focal length, the method comprises: calculating a general exposure value according to the exposure feature value and a portion other than the face block in the first image; calculating a flash feature value according to the exposure feature value and the general exposure value; and setting a guide number (GN) and a diaphragm value based on the flash feature value.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The detailed features and advantages of the present invention are described below, and the content of the detailed description is sufficient for those skilled in the art to understand the technical content of the present invention and to implement the present invention accordingly. Based upon the content disclosed in the specification, the claims, and the drawings, those skilled in the art can easily understand the relevant objectives and advantages of the present invention.

Figure 1:
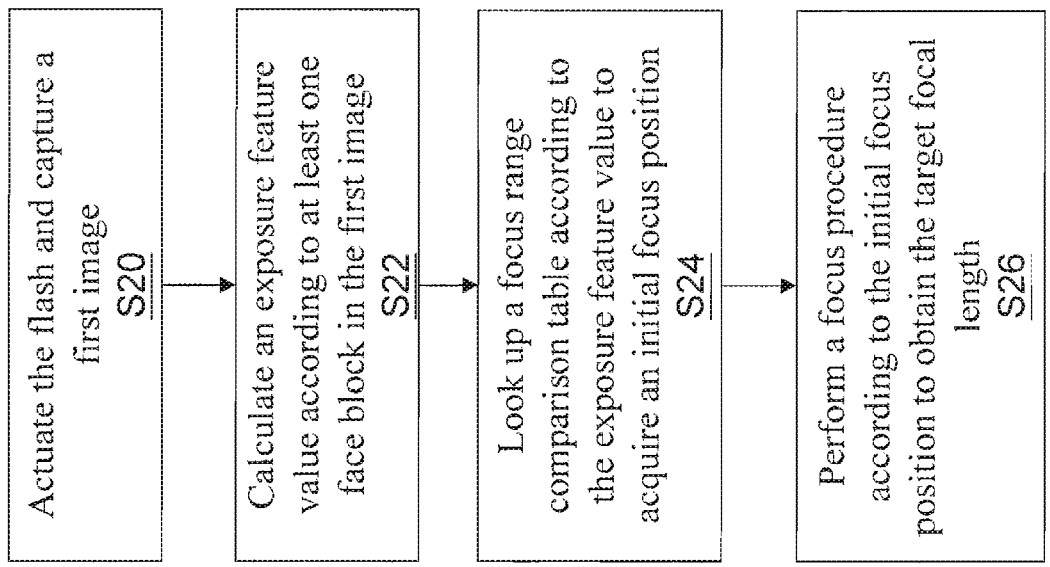
FIG. 1 is a schematic flow chart of a method for using a flash to assist in focal length detection according to an embodiment of the present invention.

FIG. 1 is a flow chart of a method for using a flash to assist in focal length detection according to an embodiment of the present invention. The method for using the flash to assist in focal length detection in the present invention is adapted to a digital camera with the flash. The method provides a target focal length of the digital camera according to a target to be photographed containing at least one human face. The digital camera for which the present invention is suitable may be, but not limited to, that shown in FIG. 2.

The digital camera 100 comprises the flash 102, a lens device 104, a diaphragm device 106, a photosensitive element (CCD) 108, a sampling hold circuit 110, a storage unit 112, a drive motor 114, a processing unit 116, and an operating device 118. Light reflected by a scene enters the CCD 108 via the lens device 104 and the diaphragm device 106, and the CCD 108 converts the incoming light into an image signal, which is transmitted to the sampling hold circuit 110. The storage unit 112 stores the image signal.

In the photographing, the processing unit 116 actuates the drive motor 114 to move the lens device 104 to a designated focal length position. The processing unit 116 also adjusts the diaphragm device 106 through the drive motor 114. The CCD 108 corresponding to the lens device 104 converts an image picture of the current scene into an electrical signal of a digital image. Driven by the processing unit, the sampling hold circuit 110 transmits the image signal received by the CCD 108 to the storage unit 112. The processing unit 116 determines that a focusing focal length of the lens device 104 needs to be adjusted to enable the digital camera 100 to take a picture according to a preview image captured in the image capture and preview stage.

Figure 2:
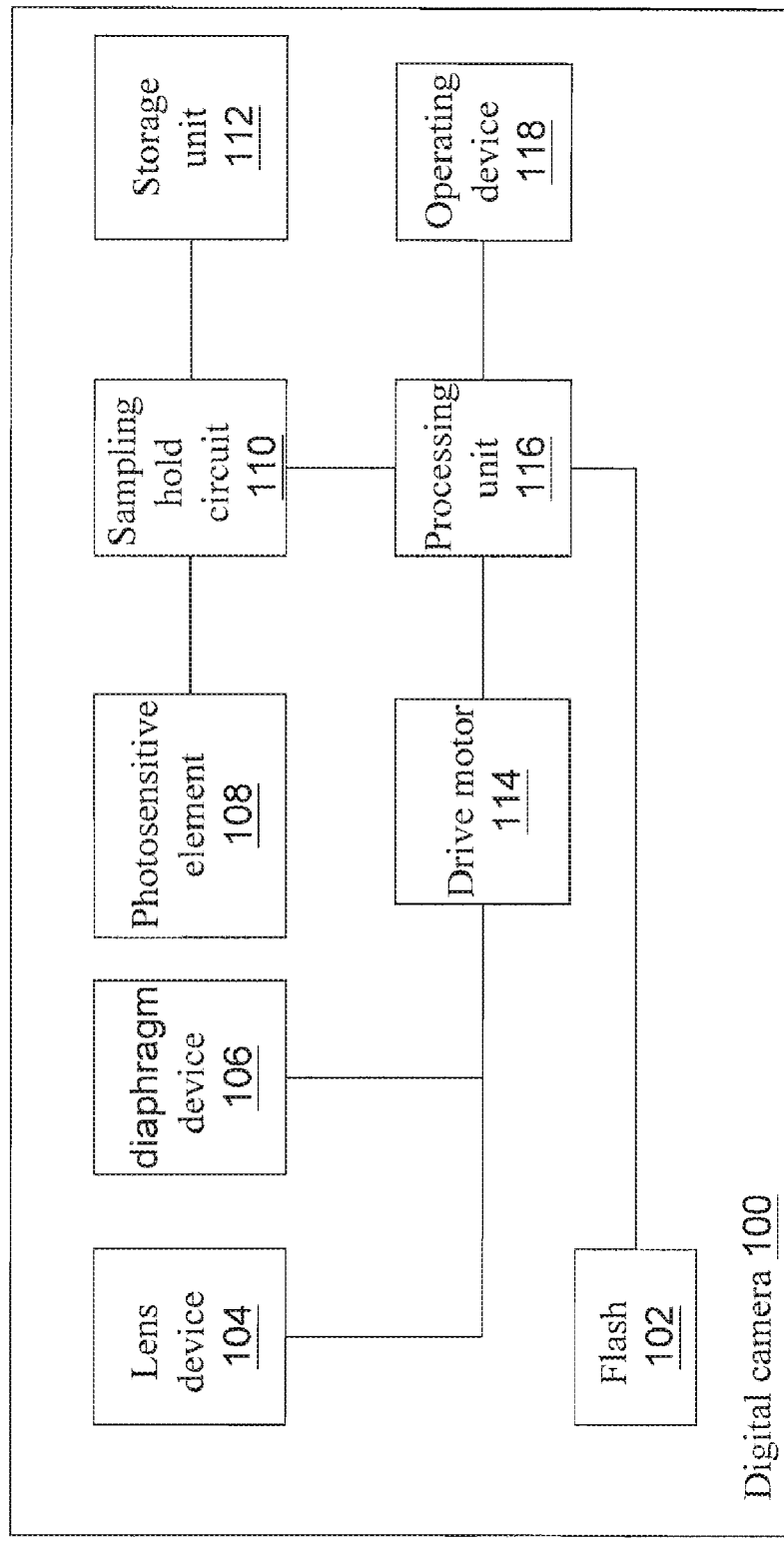
FIG. 2 is a schematic architectural view of a digital camera to which the present invention is applicable.

Referring to FIGS. 1 and 2, as can be seen from FIG. 1, the method for using a flash to assist in focal length detection comprises: Step S20: actuating the flash and capturing a first image; Step S22: calculating an exposure feature value according to at least one face block in the first image; Step S24: looking up a focus range comparison table according to the exposure feature value to acquire an initial focus position; and Step S26: performing a focus procedure according to the initial focus position to obtain the target focal length.

In Step S20, the processing unit 116 actuates the flash 102 through the drive motor 114. When the flash 102 emits a pre-flash light, the digital camera 100 captures the first image and records it in the storage unit 112. The processing unit 116 analyzes the first image and uses the analyzed data to assist in auto focus. The number of the captured image is not limited to only one, and for the sake of precision, the plurality of images may be used for processing in actual applications. Hereinafter, only a single image is used for illustration.

The first image in Step S22 represents a combination of ambient light reflected by the object to be photographed containing at least one human face and the reflected light emitted by the flash 102, and thus the light forming the first image comprises the reflected pre-flash light. As a result, an exposure value here may also be referred to as a reflected exposure value. The exposure feature value denotes an exposure degree in a state where the object to be photographed is given the pre-flash light, which may vary for different distances between the object to be photographed and the digital camera 100. The calculation of the exposure feature value is described in detail later.

After the exposure feature value is obtained, in Step S24, the focus range comparison table is looked up according to the exposure feature value. The focus range comparison table comprises a plurality of exposure tabulated values and a plurality of focal length value corresponding to the exposure tabulated values. The focus range comparison table is a comparison table of exposure feature values and possible focal length values corresponding to the exposure feature values. That is, the initial focus position can be obtained by looking up the exposure tabulated values for the focal length value corresponding to the exposure feature value according to the exposure feature value. The initial focus position obtained after looking up the focus range comparison table according to the exposure feature value may be provided for use in the subsequent focus procedure. The method for creating the focus range comparison table will be described in detail later.

In Step S26, the obtained initial focus position is used as a reference point of a focus scanning position of the focus procedure, so as to avoid the problem that all focus positions in the range from the minimum focus distance to infinity must be scanned in the focus procedure, thereby reducing the focusing time and power consumption required by the conventional focus procedure.

Figure 3A:
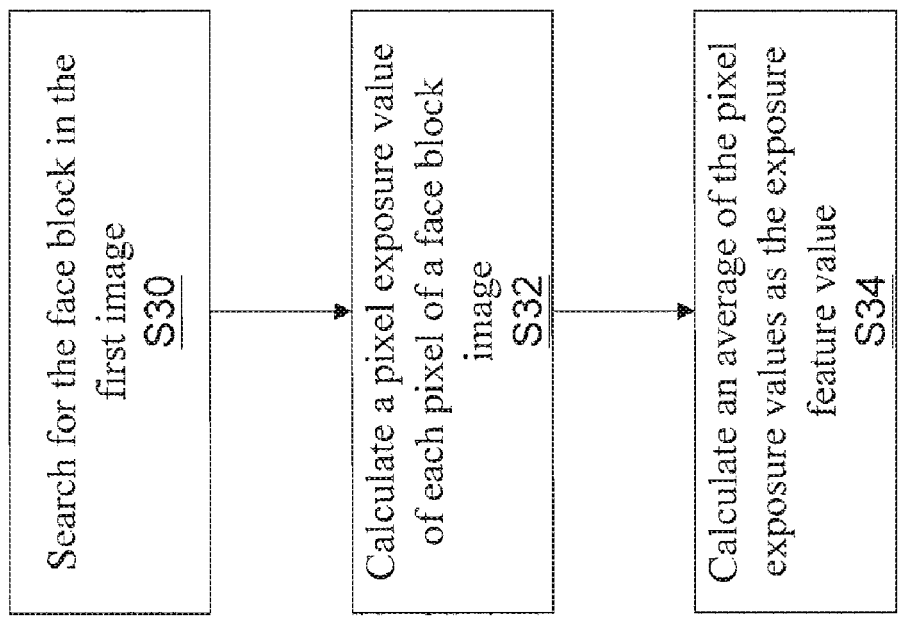
FIG. 3A is a schematic flow chart of a first embodiment of Step S22 according to an embodiment of the present invention.

The step of acquiring the exposure feature value from the first image is as shown in FIGS. 3A, 3B, 3C, and 3D. FIG. 3A is a schematic flow chart of a first embodiment of Step S22 according to an embodiment of the present invention. The process of this embodiment comprises: Step S30: searching for the face block in the first image; Step S32: calculating a pixel exposure value of each pixel of a face block image; and Step S34: taking an average of the pixel exposure values as the exposure feature value.

First, in Step S30, the face block, i.e., a face portion contained in the first image, is searched for in the first image, and the face block image is captured. The shape of the face block may be, but is not limited to, a square, and a size and position thereof in the image are not limited either.

Then, in Step S32, the pixel exposure value of all pixels of the face block image is calculated. Each pixel has an RGB value, which respectively refers to red, green, and blue values of the pixel. The method comprises first converting the RGB value of each pixel into a gray scale value based on a formula (0.6G+0.3R+0.1B), and then calculating the exposure value of each pixel from the gray scale value according to a formula $\log_2(0.6G+0.3R+0.1B)$. After the pixel exposure values of all the pixels in the face block image are calculated, in Step S34, an average of the pixel exposure values is calculated and taken as an exposure feature value.

Figure 3B:
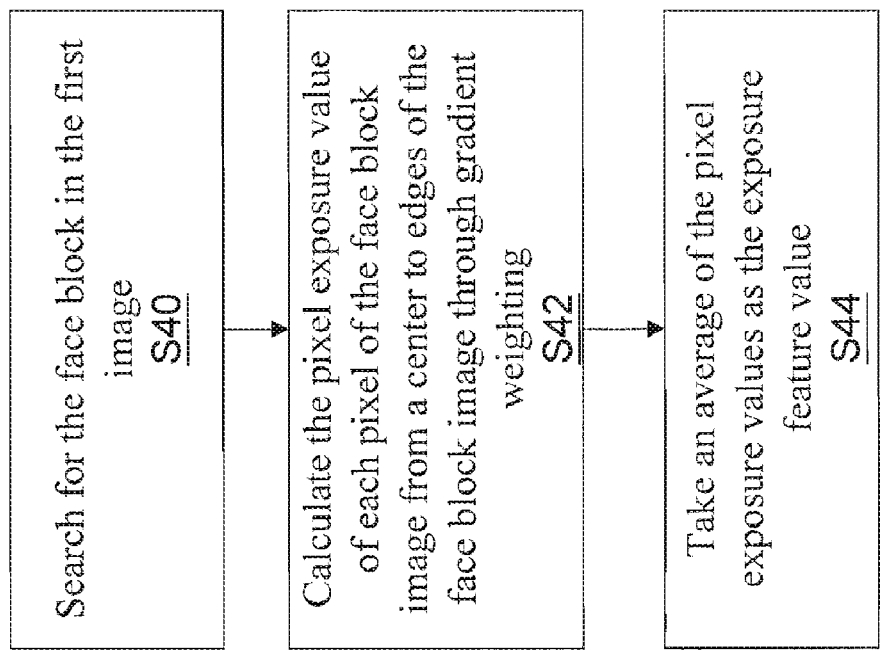
FIG. 3B is a schematic flow chart of a second embodiment of Step S22 according to an embodiment of the present invention.

FIG. 3B is a schematic flow chart of a second embodiment of Step S22 according to an embodiment of the present invention. The process of this embodiment comprises: Step S40: searching for the face block in the first image; Step S42: calculating the pixel exposure value of each pixel of the face block image from a center to edges of the face block image through gradient weighting; and Step S44: taking an average of the pixel exposure values as the exposure feature value.

In Step S40, after a face block in the first image is searched out, a face block image in the face block is captured. In Step S42, after the pixel exposure value of each pixel in the face block image is calculated as described above, a weighting calculation is performed on all the exposure values. The step of assigning the weight is as follows. First, a maximum face pixel weight is assigned to a pixel in the very center of the face block image. Then, a minimum face pixel weight is assigned to pixels at edges of the face block image. Finally, face pixel weights are assigned to the remaining pixels in the face block image through an interpolation method. Each pixel exposure value is multiplied by the corresponding face pixel weight so as to obtain a corresponding pixel exposure value for each of the pixels in the face block image. In Step S44, an average of all the pixel exposure values is calculated and taken as the exposure feature value of the first image.

Figure 3C:
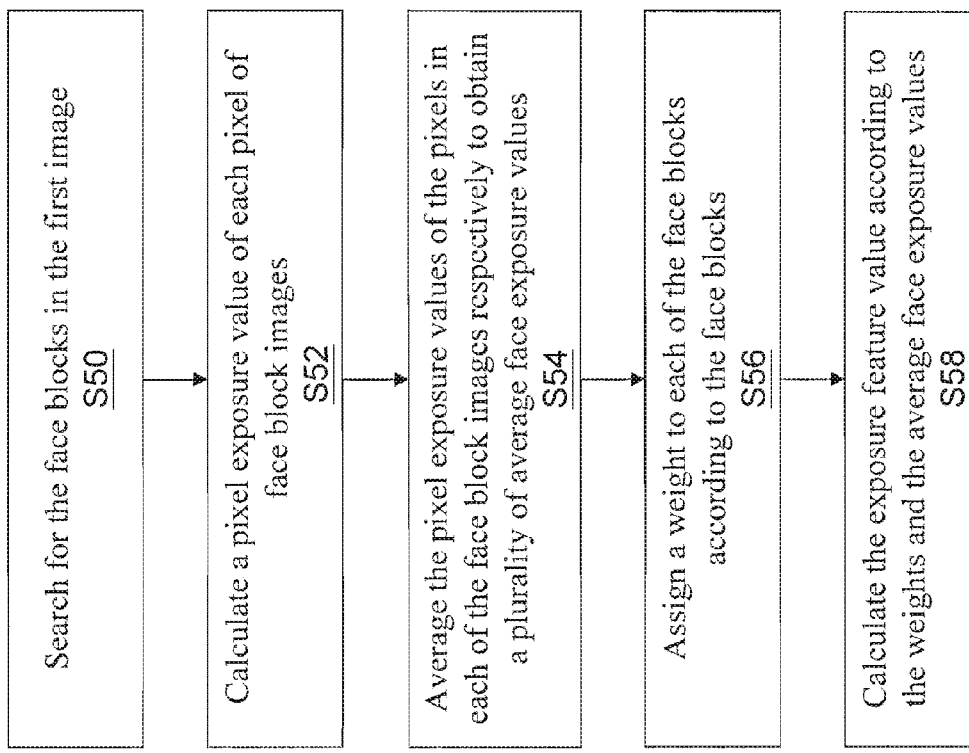
FIG. 3C is a schematic flow chart of a third embodiment of Step S22 according to an embodiment of the present invention.

FIG. 3C is a schematic flow chart of a third embodiment of Step S22 according to an embodiment of the present invention. The process of this embodiment comprises: Step S50: searching for the face blocks in the first image; Step S52: calculating a pixel exposure value of each pixel of face block images; Step S54: averaging the pixel exposure values of the pixels in each of the face block images respectively to obtain a plurality of average face exposure values; Step S56: assigning a weight to each of the face blocks based on the face blocks; and Step S58: calculating the exposure feature value according to the weights and the average face exposure values.

In Step S50, a plurality of face blocks is searched for in the first image, and a face block image is captured for each face block. Then, in Step S52, pixel exposure values of pixels in all the face block images are calculated according to the formulas above. In Step S54, an average of the corresponding pixel exposure values in each of the face block images is respectively taken as the average face exposure value of each of the face block images.

After the average face exposure values are obtained, in Step S56, a weight is assigned to each face block according to the face blocks. When the first image has the plurality of face blocks, weights may be assigned according to distances of the faces in the image to adjust the exposure feature value. Since a nearer face portion is more possibly the subject for photographing, a greater weight is assigned to a face block corresponding to the face block with the near face portion.

In the first image, the larger face block may indicate that a face corresponding to the block is nearer to the digital camera, and thus is assigned the larger weight. Then, according to the present invention, the method for assigning weights may comprise the following steps. First, the number of pixels of each face block image is calculated as a face block size value representing a size of each face block. A plurality of face block weights is assigned according to the face block size values, that is, the greater the face block size values are, the greater the obtained face block weights will be.

Further, the face block having a greater average face exposure value in the first image indicates that the corresponding face portion thereof is brighter, which possibly indicates that the energy of the reflected pre-fired flash is stronger, and represents that the face is nearer to the digital camera, and thus is assigned a greater weight. Then, according to the present invention, the method for assigning weights may also comprise: sorting the average face exposure values, and assigning weights according to the order. That is, the greater the average face exposure value is, the greater the weight assigned to the corresponding face block will be.

After the weights are assigned to all the face blocks, in Step S58, the weighting calculation is performed according to the weights and the corresponding average face exposure values to obtain an exposure feature value.

Figure 3D:
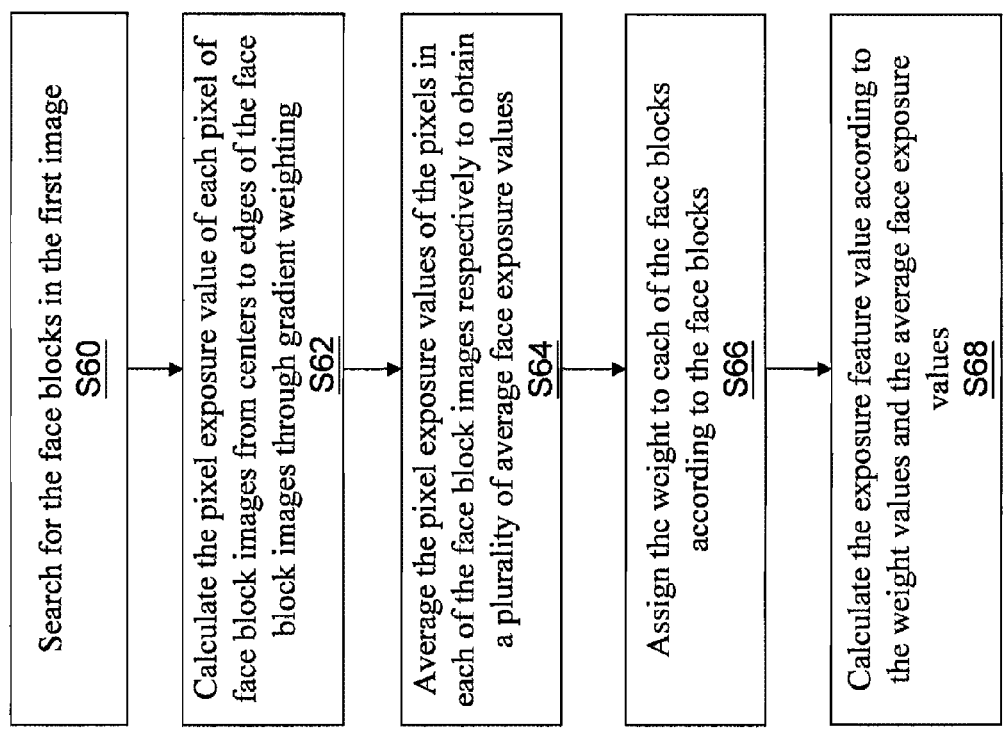
FIG. 3D is a schematic flow chart of a fourth embodiment of Step S22 according to an embodiment of the present invention.

FIG. 3D is a schematic flow chart of a fourth embodiment of Step S22 according to an embodiment of the present invention. The process of this embodiment comprises: Step S60: searching for the face blocks in the first image; Step S62: calculating the pixel exposure value of each pixel of face block images from centers to edges of the face block images through gradient weighting; Step S64: averaging the pixel exposure values of the pixels in each of the face block images respectively to obtain a plurality of average face exposure values; Step S66: assigning the weight to each of the face blocks according to the face blocks; and Step S68: calculating the exposure feature value according to the weights and the average face exposure values.

In Step S60, the plurality of face blocks in the first image is searched for, and face block images corresponding to the face blocks are captured. In Step S62, after exposure values of pixels in all the face block images are calculated according to the formulas above, the pixel exposure value of each pixel is calculated through gradient weighting for each face block image. The method for assigning face pixel weights in the gradient weighting comprises: first, assigning a maximum face pixel weight to pixels in the centers of the face block images, assigning a minimum face pixel weight to pixels at edges of the face block images, and then, assigning corresponding face pixel weights to the remaining pixels through the interpolation method.

After the pixel exposure values of all the face block images are obtained, in Step S64, an average of the corresponding pixel exposure values is taken as the average face exposure value according to each face block. In Step S66, face block weights may be assigned according to face block sizes or the brightness of average face exposure values, as described in Step S56. Afterwards, in Step S68, the weighting calculation is performed according to the obtained weights and corresponding average face exposure values to obtain an exposure feature value.

According to the present invention, in the above method for calculating the exposure value of the focusing frame image, an average of pixels in a brighter portion in the focusing frame image, instead of all the pixels of the focusing frame image, may be calculated as the exposure value of the focusing frame image. The brighter portion refers to pixels having higher exposure values after all the pixels are sorted according to the exposure values. For example, the exposure value of the focusing frame image may be calculated by taking the brightest 30% or 50% pixels of the focusing frame image, and then the exposure feature value is calculated accordingly. In this way, the influence caused by lots of environment images with insufficient brightness in the captured image is avoided.

After the exposure feature value is obtained, Step S24 is performed, in which the focus range comparison table is looked up according to the exposure feature value to acquire the initial focus position.

According to the embodiment of the present invention, the obtained exposure feature value may not have the exact corresponding exposure tabulated value in the focus range comparison table. At this time, two of the exposure tabulated values closest to the exposure feature value and corresponding focal length values thereof in the table are taken, and the focal length value corresponding to the exposure feature value is calculated through the interpolation method and taken as the initial focus position.

Figure 4:
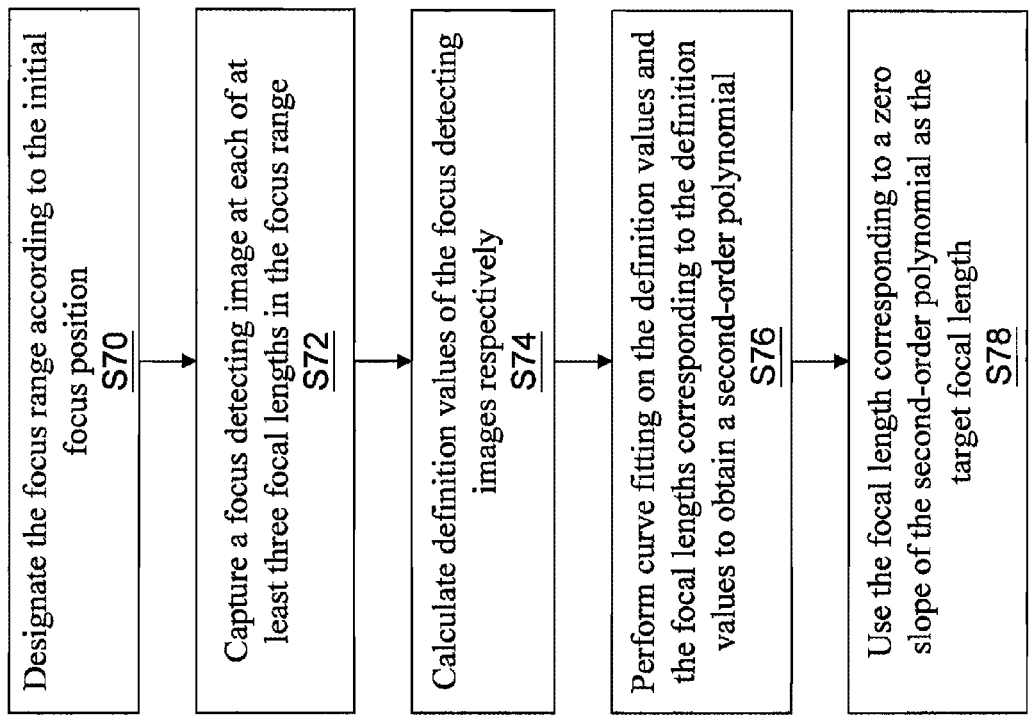
FIG. 4 is a schematic flow chart of Step S26 according to an embodiment of the present invention.

FIG. 4 is a schematic flow chart of Step S26 according to an embodiment of the present invention. As can be seen from FIG. 4, the process comprises: Step S70: designating the focus range according to the initial focus position; Step S72: capturing a focus detecting image at each of at least three focal lengths in the focus range; Step S74: calculating definition values of the focus detecting images respectively; Step S76: performing curve fitting on the definition values and the focal lengths corresponding to the definition values to obtain a second-order polynomial; and Step S78: using the focal length corresponding to a zero slope of the second-order polynomial as the target focal length.

In Step S70, the focus range is designated according to the initial focus position for the focus procedure to search for the target focal length in the range. The method for designating the focus range according to the initial focus position has several embodiments. One embodiment is to increase the initial focus position by three or more steps towards near focus and far focus positions, in which the length of the steps may be or may not be consistent with each other. According to an embodiment of the present invention, the focus range may be determined according to a zooming factor in capturing the first image. For example, if the zooming factor of the digital camera is near the wide side, the camera is possibly focused on a distant sight or at a long focal length when the first image is captured. Therefore, the range starting from three steps from the initial focus position near the digital camera up to six steps from the initial focus position far from the digital camera may be designated as the focus range.

Further, according to another embodiment of the present invention, if the zooming factor of the digital camera is near the tele side (such that a distant scene image is drawn near the digital camera and a function of zooming in the image is achieved) when the first image is captured, a range starting from six steps from the initial focus position near the digital camera up to twelve steps from the initial focus position far from the digital camera is designated as the focus range.

According to the present invention, in the method for designating the focus range according to the initial focus position, the unit is not limited to one step. The focus range may also be designated in a unit of a plurality of steps or a distance (for example, one centimeter or one millimeter). Besides, the ranges found with reference to the initial focus position in the directions close to and away from the initial focus position are not limited either. In addition to the above embodiments, the ranges found with reference to the initial focus position in the directions close to and away from the initial focus position may also be the same, or the range in the direction close to the initial focus position is larger.

In Step S72, the focus detecting image is captured at focal lengths respectively in the focus range designated in Step S70, in which the focus range comprises at least three focal lengths. The focus procedure may perform calculation and analysis on the focus detecting images to obtain the final target focal length.

In Step S74, definition values of the captured focus detecting images are calculated respectively. According to an embodiment of the present invention, the method for calculating the definition value may comprise processing the focus detecting image by an edge-detection procedure first. The edge-detection procedure may employ a Sobel edge-detection method, a Dijkstra's algorithm, a Canny edge-detection algorithm, or the like, and is not limited thereto according to the present invention. After the processing by the edge-detection procedure, the definition value may be defined as the number of edges in the focus detecting image.

Figure 5A:
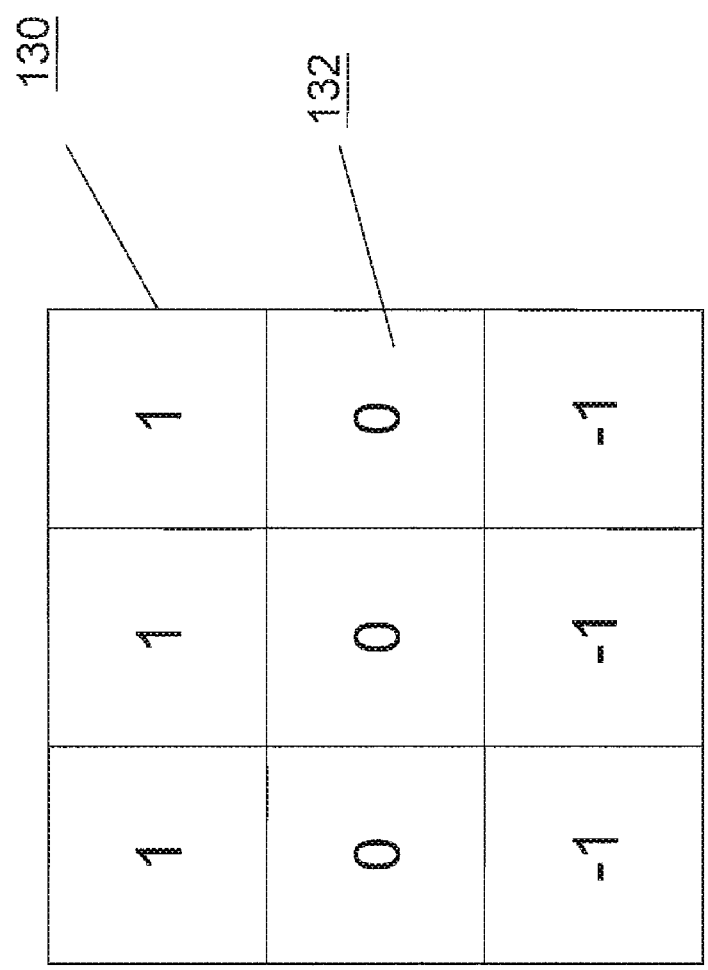
FIG. 5A is a schematic view of a horizontal mask according to an embodiment of the present invention.
Figure 5B:
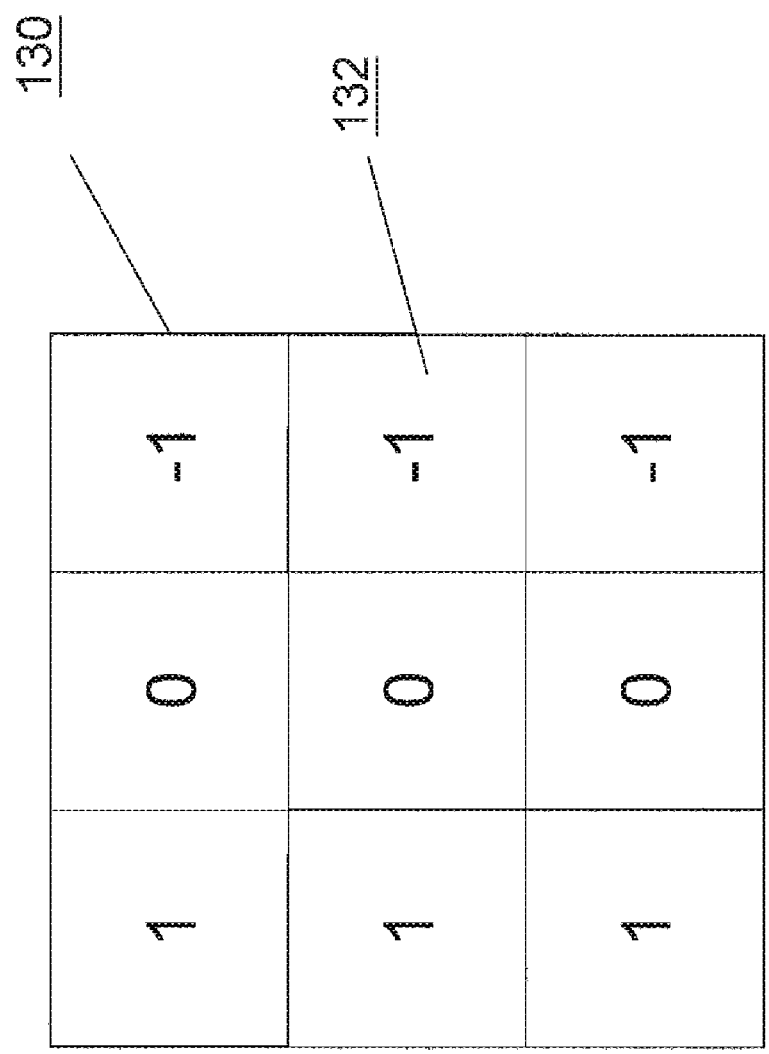
FIG. 5B is a schematic view of a vertical mask according to an embodiment of the present invention.

The edge-detection procedure according to the present invention applies a horizontal mask or vertical mask to each of the focus detecting images respectively. The content of the masks is as shown in FIGS. 5A and 5B, which are respectively schematic views of the horizontal mask and the vertical mask according to an embodiment of the present invention. As shown in the figures, the masks 130 comprise different mask content elements 132.

After the mask is applied to the focus detecting image, each pixel of the focus detecting image acquires a contrast value, and a curve is plotted according to the contrast value and their corresponding focal lengths. Each focus detecting image has a contrast curve. The procedure for calculating the definition value designates a threshold for the contrast curve. If the contrast value is higher than the threshold, it indicates that the contrast degree is high (i.e., a portion in the image that is sufficiently sharp). Next, an integral is calculated on the portion of the contrast curve higher than the threshold, and then the calculated value is defined as the definition value.

Based on the definition values, in Step S76, the second-order polynomial curve fitting is performed on the definition values of the focus detecting images and the focal lengths corresponding to the definition values to obtain the second-order polynomial. The calculated second-order polynomial denotes a variation of the definitions of the focus detecting images captured in the designated focus range. Thus, a vertex of the second-order polynomial, i.e., a point with the zero slope, represents the maximum definition value that can be acquired in the focus range and the focal length at which the image having the highest definition can be obtained.

In order to obtain the vertex of the second-order polynomial, in Step S78, a differential is calculated for the second-order polynomial to search for a point with zero differential, i.e., the point with the zero slope, on the polynomial. In Step S78, the focal length corresponding to the point with the zero slope in the second-order polynomial is used as the target focal length. According to an embodiment of the present invention, when the point with the zero slope of the second-order polynomial obtained by the curve fitting does not exactly fall on any focal length designated in the focus range, the focal length nearest to the point with the zero slope is taken as the target focal length.

According to another embodiment of the present invention, when the second-order polynomial obtained in the focus range does not have any point with zero slope, the focus range scanned by the focus procedure is expanded to obtain more focus detecting images. The focus procedure performs the curve fitting again according to the original focus detecting images and the newly obtained focus detecting images, and searches for the point with the zero slope on the new second-order polynomial to obtain the target focal length.

According to the present invention, after acquiring the target focal length through the method for using a flash to assist in focal length detection, the digital camera 100 drives the lens device 104 to move to the designated focal length position via the drive motor 114 and performs photographing.

Figure 6:
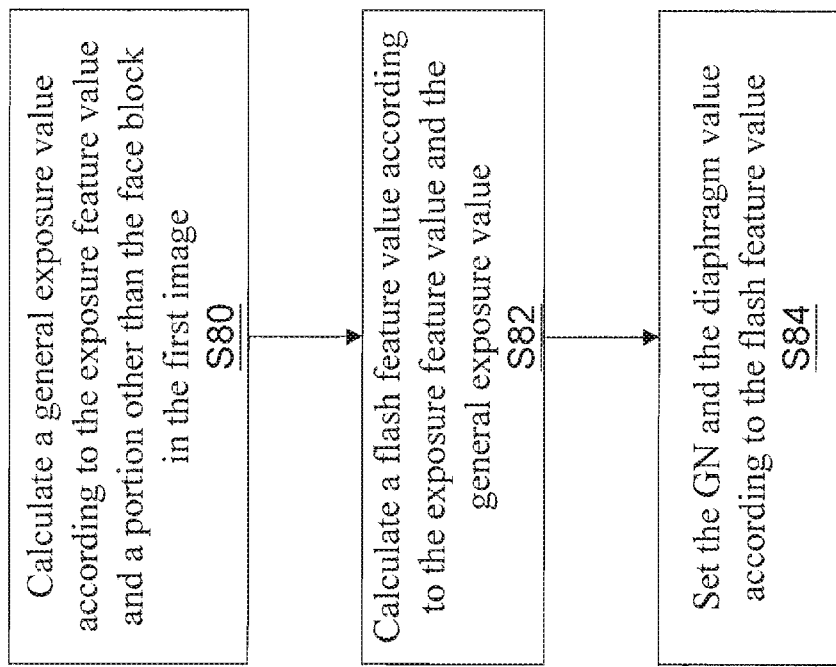
FIG. 6 is a schematic flow chart of setting a GN and a diaphragm value based on a first image and an exposure feature value after a target focal length is obtained according to an embodiment of the present invention.

FIG. 6 is a schematic flow chart of setting a GN and a diaphragm value based on the first image and the exposure feature value after the target focal length is obtained according to an embodiment of the present invention. As can be seen from FIG. 6, the process comprises: Step S80: calculating a general exposure value according to the exposure feature value and a portion other than the face block in the first image; Step S82: calculating a flash feature value according to the exposure feature value and the general exposure value; and Step S84: setting the GN and the diaphragm value according to the flash feature value.

According to the exposure feature value obtained in Step S22, in Step S80, a general pixel exposure value of each pixel in the portion other than the face block in the first image is calculated, and an average of the general pixel exposure values is taken as the general exposure value. Since a human image is usually used as the subject for photographing, the calculation of photographing parameters such as the focal length or flash intensity should be adjusted based on the human face. Therefore, in this embodiment, weights are assigned to general pixels in the first image according to the exposure feature value obtained from the face block image so as to obtain a proper main flash intensity of the flash.

In Step S80, the weight smaller than zero is assigned to general pixels having the general pixel exposure values higher than the exposure feature value, the weight greater than zero is assigned to general pixels having the general pixel exposure value lower than the exposure feature value, and the weight equal to 1 is assigned to general pixels having the general pixel exposure values equal to the exposure feature value. Besides, the absolute value of the weight is determined according to a difference between the general pixel exposure value and the exposure feature value, such that the general pixel having a larger difference is the assigned weight having a larger absolute value. After the weights are determined, each general pixel exposure value is multiplied by the corresponding weight so as to acquire the general exposure value.

In Step S82, an average of the exposure feature value and the general exposure value may be calculated as the flash feature value. The flash feature value represents an overall exposure value of the first image adjusted by the weighting method emphasizing the face.

According to the flash feature value, in Step S84, the GN of the flash to be fired may be obtained by querying a flash comparison table. The flash comparison table comprises a plurality of flash tabulated values and GNs corresponding to the flash tabulated values. The GN required for the flash feature value can be obtained from the flash comparison table according to the flash feature value for use in the subsequent main flash. The method for creating the flash comparison table will be described in detail later.

An diaphragm value required by the corresponding target focal length and GN can be calculated according to the GN and the target focal length obtained in Step S26 based on a formula GN=D*F (D denotes a distance from the subject for photographing to the digital camera and may be substituted by the target focal length, and F denotes the diaphragm value). Then, the digital camera 100 can fire the flash 102 according to the GN obtained by looking up the table, and change the diaphragm device 106 through the drive motor 114 to perform the photographing.

The focus range comparison table may be created with an experimental method. In the experimental method, the flash fires in a dark room and various objects are photographed at different focal lengths, and exposure feature values corresponding to the focal lengths are calculated, thereby creating the focus range comparison table. The object to be photographed may be any object or a wall. The experiment may obtain multiple sets of exposure feature values based on surface characteristics (for example, easy to reflect light or easy to absorb light) of different objects to the photographed, so as to generate multiple sets of focus range comparison tables, and provide different modes for the selection of the user according to actual photographing conditions. Similarly, in the experiment, multiple sets of different photographing environmental conditions may also be simulated in the dark room to obtain multiple sets of corresponding focus range comparison tables, so as to provide different modes for the selection of the user according to actual photographing conditions.

Further, the flash comparison table may also be created with an experimental method. Various objects are photographed with flashes of different intensities in the dark room and flash feature values corresponding to the GNs are calculated, thereby creating the flash comparison table.

The method for using a flash to assist in focal length detection according to the present invention is applied to the digital camera having the flash. The exposure feature value can be calculated according to the first image containing at least one face block that is captured at the time of pre-flash. The target focal length of the digital camera can be provided according to the exposure feature value. Thus, hardware equipment such as a lens device of the digital camera can shoot a digital image. In addition, based on the exposure feature value and the target focal length, the GN and the diaphragm value can be provided to the flash and the diaphragm device of the digital camera for photographing by the digital camera.

What is claimed is:
1. A method for using a flash to assist in focal length detection, adapted to a digital camera having a flash, for providing a target focal length of the digital camera according to a target to be photographed containing at least one human face, the method comprising:
   firing the flash, and capturing a first image for the target to be photographed;

calculating an exposure feature value according to at least one face block in the first image, wherein the face block is corresponding to the human face;

looking up a focus range comparison table according to the exposure feature value to acquire an initial focus position; and performing a focus procedure according to the initial focus position to obtain the target focal length.

2. The method for using a flash to assist in focal length detection according to claim 1, wherein the step of calculating an exposure feature value according to at least one face block in the first image comprises:

searching for the face block in the first image, wherein the face block has a face block image;

calculating a pixel exposure value of each pixel of the face block image; and taking an average of the pixel exposure values as the exposure feature value.

3. The method for using a flash to assist in focal length detection according to claim 1, wherein the step of calculating an exposure feature value according to at least one face block in the first image further comprises:

searching for the face block in the first image, wherein the face block has a face block image;

calculating a pixel exposure value of each pixel of the face block image from a center of the face block image to edges of the face block image through gradient weighting; and taking an average of the pixel exposure values as the exposure feature value.

4. The method for using a flash to assist in focal length detection according to claim 1, wherein the step of calculating an exposure feature value according to at least one face block in the first image further comprises:

searching for the face blocks in the first image, wherein each of the face blocks has a face block image;

calculating a pixel exposure value of each pixel of the face block images;

averaging the pixel exposure values of the pixels in each of the face block images respectively to obtain a plurality of average face exposure values;

assigning a weight to each of the face blocks according to the face blocks; and calculating the exposure feature value according to the weights and the average face exposure values.

5. The method for using a flash to assist in focal length detection according to claim 1, wherein the step of calculating an exposure feature value according to at least one face block in the first image further comprises:

searching for the face blocks in the first image, wherein each of the face blocks has a face block image;

calculating a pixel exposure value of each pixel of the face block images from centers of the face block images to edges of the face block images through gradient weighting;

averaging the pixel exposure values of the pixels in each of the face block images respectively to obtain a plurality of average face exposure values;

assigning a weight to each of the face blocks according to the face blocks; and calculating the exposure feature value according to the weights and the average face exposure values.

6. The method for using a flash to assist in focal length detection according to claim 1, wherein the focus range comparison table comprises a plurality of exposure tabulated values and a plurality of focal length values corresponding to the exposure tabulated values, and the step of looking up the focus range comparison table according to the exposure feature value to acquire an initial focus position comprises looking up the focus range comparison table for the exposure tabulated value according to the exposure feature value, and using the focal length value corresponding to the exposure feature value as the initial focus position.

7. The method for using a flash to assist in focal length detection according to claim 1, wherein the step of performing a focus procedure according to the initial focus position to obtain the target focal length comprises:

designating a focus range according to the initial focus position;

capturing a focus detecting image at each of at least three focal lengths in the focus range;

calculating a definition value of each of the focus detecting images;

performing curve fitting on the definition values and the focal lengths corresponding to the definition values to obtain a second-order polynomial; and using the focal length corresponding to a zero slope of the second-order polynomial as the target focal length.

8. The method for using a flash to assist in focal length detection according to claim 1, wherein after the step of performing a focus procedure according to the initial focus position to obtain the target focal length, the method comprises:

calculating a general exposure value according to the exposure feature value and a portion other than the face block in the first image;

calculating a flash feature value according to the exposure feature value and the general exposure value; and setting a guide number (GN) and a diaphragm value according to the flash feature value.

* * * * *